J. McLAREN.
Wrench.

No. 8,064. Reissued Jan. 29, 1878.

Attest.
H. D. Pierce.
James M. Wright Jr.

James McLaren.
Inventor.
By James L. Norris.
Atty.

N. PETERS, PHOTO-LITHOGRAPHER, WASHINGTON, D. C.

UNITED STATES PATENT OFFICE.

JAMES McLAREN, OF ALBANY, NEW YORK.

IMPROVEMENT IN WRENCHES.

Specification forming part of Letters Patent No. 59,852, dated November 20, 1866; Reissue No. 8,064, dated January 29, 1878; application filed December 20, 1877.

*To all whom it may concern:*

Be it known that I, JAMES McLAREN, of Albany, in the county of Albany and State of New York, have invented certain new and useful Improvements in Wrenches, of which the following is a specification:

This invention relates to a new and improved wrench, its object being to combine in a single tool two sets of griping-jaws adapted to gripe either a surface having parallel faces, such as a square or polygonal headed nut, or an irregular or cylindrical body, such as a pipe or cylinder; and it consists in the combination, in a duplex wrench, of two stationary jaws on a screw-threaded shank or stock, and a slide operated by a screw-nut, and having projecting from one of its sides a rigid jaw, and connected to the opposite side a yielding spring-jaw, adapted to serve, in conjunction with one of the stationary jaws, as a pipe-wrench.

Figure 1:
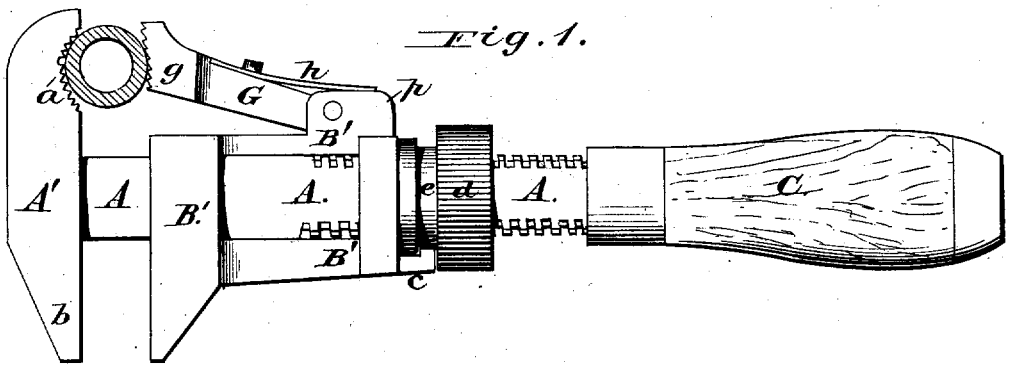
Figure 2:
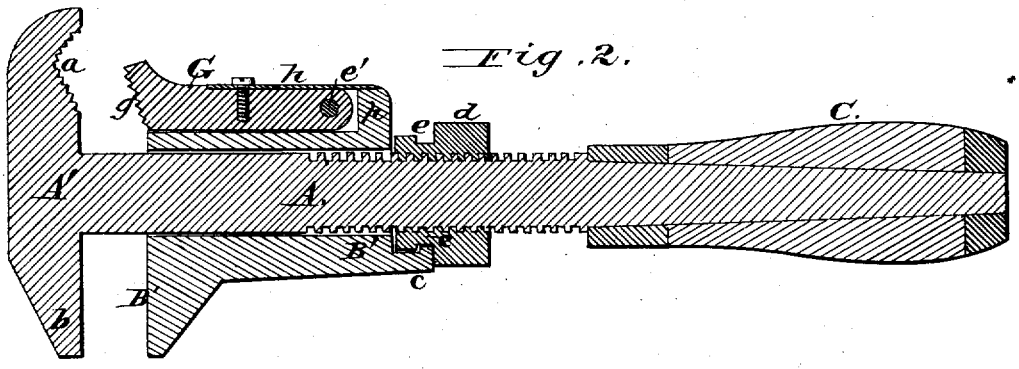
Figure 3:
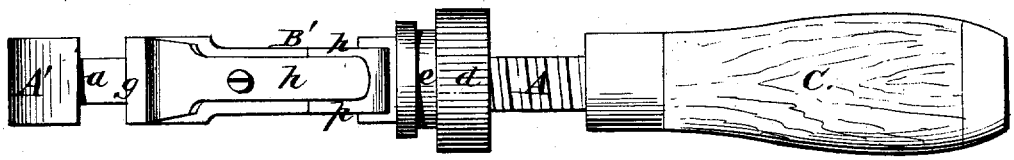

In the drawing, Figure 1 represents an elevation of my improved wrench; Fig. 2, a longitudinal section thereof, and Fig. 3 a top view of the same.

The letter A represents the stock of the wrench, having at one end a T-head, A′, which forms the two stationary jaws of the wrench, and at the other a handle, C.

B′ represents a movable slide capable of sliding longitudinally on the stock A, and having at one side a rigid jaw, B, the rear end of said slide being provided with a lip, *c*, which sets into an annular groove, *e*, formed in the screw-nut *d*, which rides on the threaded portions of the stock A, and serves to operate the movable slide B′, to adjust the jaws of the wrench to and from each other. One of the stationary jaws is provided with a curved or angular griping-surface, *a*, which is provided with teeth or serrations, as shown, and serves, in connection with a yielding jaw hereinafter described, to adapt the wrench to be used as a pipe-wrench. Said cross or T head is also provided with a jaw having a plain griping-surface, *b*, which serves, in connection with a similar griping-surface on the rigid movable jaw B, to adapt the wrench to be used as a nut-wrench.

The letter G represents a yielding jaw attached to a projection, *p*, at the rear of the slide B′, said yielding jaw having its rear end inserted in a recess in the projection *p*, and being pivoted therein by means of a pivot or pin, *e′*, the extremity of said yielding jaw abutting against the rear of the recess, which serves to relieve the pin or pivot of a part of the strain brought upon the jaw when griping any object. The front end of said yielding jaw is provided with an inclined or beveled griping-surface, *g*, which is serrated in order to take better hold of the surface to be grasped.

In order to insure the proper operation of the jaw G, a spring, *h*, is secured thereto, the rear end of which bears against the projection *p*, and forces the jaw into contact with the surface to be grasped.

As thus constructed, it will be perceived that the wrench can be employed as an ordinary monkey-wrench upon bodies having parallel sides or faces, such as square or polygonal nuts or bolt-heads, the parallel jaws being employed for such purposes, while the tool can be as readily employed for irregular or cylindrical bodies, in the same manner as a pair of pipe-tongs, by means of the stationary and yielding jaw, with this advantage, however, that the jaws can be adjusted to and from each other, adapting the tool to a greater range of sizes in the pipes or tubes than the ordinary pipe-tongs.

What I claim, and desire to secure by Letters Patent, is—

1. The combination, in a duplex wrench, of two stationary jaws on a screw-threaded shank or stock, and a slide operated by a screw-nut, and having projecting from one of its sides a rigid jaw, and connected to the opposite side a yielding spring-jaw, adapted to serve, in conjunction with one of the stationary jaws, as a pipe-wrench, substantially as described.

2. In a duplex wrench, the combination of the two stationary jaws and shank, and a sliding jaw having a separate yielding spring-jaw connected thereto, substantially as described.

3. The combination, in a duplex wrench, of a shank having two stationary jaws, a rigid sliding jaw, and a laterally-yielding spring-jaw, substantially as set forth.

JAMES McLAREN.

Witnesses:

WILLIAM H. LOW,

E. P. BENNETT.